US011919294B2

(12) United States Patent
Ferri Soler

(10) Patent No.: US 11,919,294 B2
(45) Date of Patent: Mar. 5, 2024

(54) SYSTEM AND METHOD FOR DECORATING SUITCASES AND LUGGAGE ITEMS

(71) Applicant: Juan Ferri Soler, Ontinyent (ES)

(72) Inventor: Juan Ferri Soler, Ontinyent (ES)

( * ) Notice: Subject to any disclaimer, the term of this patent is extended or adjusted under 35 U.S.C. 154(b) by 204 days.

(21) Appl. No.: 17/633,728

(22) PCT Filed: Jul. 2, 2020

(86) PCT No.: PCT/ES2020/070426
§ 371 (c)(1),
(2) Date: Feb. 8, 2022

(87) PCT Pub. No.: WO2021/028606
PCT Pub. Date: Feb. 18, 2021

(65) Prior Publication Data
US 2022/0324237 A1 Oct. 13, 2022

(30) Foreign Application Priority Data
Aug. 9, 2019 (ES) .............................. ES201930740

(51) Int. Cl.
*B41J 11/00* (2006.01)
*A45C 5/03* (2006.01)
(Continued)

(52) U.S. Cl.
CPC ............... *B41J 11/007* (2013.01); *A45C 5/03* (2013.01); *B41J 3/4073* (2013.01); *B41J 11/002* (2013.01);
(Continued)

(58) Field of Classification Search
CPC ...... B41J 11/007; B41J 3/4073; B41J 11/002; B41J 11/0095; A45C 5/03; B65G 43/08;
(Continued)

(56) References Cited

U.S. PATENT DOCUMENTS 4,227,607 A 10/1980 Malavenda
9,434,180 B2 * 9/2016 Onodera ..................... B41J 2/01

FOREIGN PATENT DOCUMENTS

WO 2012099461 A1 7/2012

OTHER PUBLICATIONS

JJ, "luggage printing by uv flatbed printer", uploaded Dec. 2016, www.youtube.com/watch?v=5-SeV8Au0E4.
(Continued)

*Primary Examiner* — Geoffrey S Mruk
(74) *Attorney, Agent, or Firm* — The Webb Law Firm

(57) ABSTRACT

A system for stamping suitcases and luggage items, by in-line digital printing and drying, in a single pass, including: a printing module configured to print an image on one side of the suitcase with at least one printing head and one drying lamp; movement means for moving the items to be printed, with an individual conveyor belt, synchronised with the injector and the drying lamp, and movement means formed by a plurality of individual conveyors synchronised to operate according to the presence or absence of suitcases on adjacent conveyors, preventing them from impacting each other; and a traceability-tracking system configured to determine the position of each suitcase, by means of a unique two-dimensional identification code associated with each item, or by means of supervision of an operator. It also includes trays for coupling those suitcases that have an uneven shape, controlling the movement thereof and the correct alignment of the side to be printed.

28 Claims, 4 Drawing Sheets

(51) Int. Cl.
    *B41J 3/407*     (2006.01)
    *B65G 43/08*     (2006.01)
    *B65G 43/10*     (2006.01)
    *G06K 7/14*     (2006.01)
    *G06K 19/06*     (2006.01)

(52) U.S. Cl.
    CPC ........... *B41J 11/0095* (2013.01); *B65G 43/08* (2013.01); *B65G 43/10* (2013.01); *G06K 7/1417* (2013.01); *G06K 19/06037* (2013.01); *B65G 2203/0233* (2013.01)

(58) Field of Classification Search
    CPC ............ B65G 43/10; B65G 2203/0233; G06K 7/1417; G06K 19/06037
    See application file for complete search history.

(56) References Cited

OTHER PUBLICATIONS

UV Printer Price, "High quality digital suitcase UV printing machine on draw-bar box/plastic", uploaded Oct. 2017, www.youtube.com/watch?v=ZA9L4PAGE_4.

\* cited by examiner

SYSTEM AND METHOD FOR DECORATING SUITCASES AND LUGGAGE ITEMS

CROSS-REFERENCE TO RELATED APPLICATIONS

This application is the United States national phase of International Application No. PCT/ES2020/070426 filed Jul. 2, 2020, and claims priority to Spanish Patent Application No. P201930740 filed Aug. 9, 2019, the disclosures of which are hereby incorporated by reference in their entirety.

BACKGROUND OF THE DISCLOSURE

The present disclosure relates to the technical field of digital printing and more specifically to a system for in-line digital printing and drying, in a single pass, of suitcases and luggage items, especially rigid or semi-rigid ones, made of materials such as ABS (Acrylonitrile Butadiene), PC (Polycarbonate), PP (Polypropylene), PET (Polyethylene Terephthalate), among others; and a method for digital printing of suitcases and luggage items.

DESCRIPTION OF RELATED ART

Currently, the number of people travelling has increased. This change in the mentality of people is due, among other factors, to the reduction in cost of airline tickets, the improvement of infrastructure for cars and trains, greater access to information available thanks to the internet, social networks, etc.

Based on the increasing use of means of transport, the use of suitcases and luggage items, which are essential so that people who travel can comfortably transport their belongings, has increased. Luggage items include for example backpacks, toiletry bags, etc.

Likewise, the concept of travel and ways of travelling have adapted to the needs of society and increasing numbers of travellers are travelling as a family, or accompanied by young children. In this sense, consumption needs have enabled the development of small suitcases and luggage items which can be transported by the children themselves with their belongings. The fact that each child carries their own suitcase or luggage item enables them to work on their independence and responsibility when preparing the suitcases for the trip and taking care of their own luggage.

Moreover, in our current society there is an increasing demand for customised or customisable objects. More specifically, most users want to be able to create exclusive designs tailored to their own preferences.

Likewise, without demanding a complete customisation, users quickly adapt to different fashions and the concept of "fast fashion" in which different trends quickly adapt to consumable objects such that the users can change objects depending on the trends of one season or another is increasingly widespread.

The materials that predominate lately refer to those used in completely rigid or semi-rigid suitcases and luggage items, which provide a certain degree of flexibility, such as ABS (Acrylonitrile Butadiene), PC (Polycarbonate) or PP (Polypropylene) among others, which provide greater security for the content thereof, and four wheels for greater comfort when moving around. On these materials, it is necessary to include the different colours, designs, marks, patterns or customisation required in order for it to adapt to the taste of the consumer.

In order to incorporate a design in a suitcase or rigid luggage items, whether they be made of ABS or PC, according to traditional manufacturing systems, they resort to engraving it on plates or moulds, which are subsequently applied on a sheet. The sheet is integrated into the surface of the product during the manufacturing process, wherein it is inflated and shaped by heat, thus giving rise to the final format of the suitcases and luggage items.

One of the problems derived from traditional methods and systems is that it is not possible to ensure homogeneous runs, since when the material is inflated by heat and deposited on the mould in order to take shape, and then returned to the cold state thereof, the design is often distorted. For images of people or characters, for circles, coats of arms or other designs that require precision, this is a problem because the distortion is usually considerable and the final effect is not acceptable.

Moreover, each colour incorporated by the design has high costs which, multiplied by an average of about ten colours that each suitcase and/or luggage item usually has, makes the average design costs per product very high, regardless of the production quantities that are made. The problem of high costs for each design would not be so bad if the runs were made for large quantities, but this is not the current reality, for which reason the costs often make the production of designs for small runs unfeasible.

Another added problem concerns the versatility and flexibility which are weighed down by manufacturing lead times. Traditional methods and systems involve a time for preparation, adjustment and production, for a single sample, which can be from fifteen days to one month.

Additionally, it is important to note that users, when purchasing a suitcase or luggage item, demand it to be in perfect condition. Thus, it is necessary for any system or method for manufacturing or customising suitcases and luggage items to have the necessary means to ensure that the suitcase or luggage item is kept in perfect condition during said operations and enables desired design variations.

In summary, the integration of design, colour, pattern or customisation during the process of manufacturing a rigid or semi-rigid suitcase and luggage item is currently a long and expensive process that makes the sector less versatile in adjusting the designs to parameters of precision, flexibility, speed, simplicity and cost that are required today. Furthermore, it is currently necessary to produce many different designs in a quick manner, which is missing in the state of the art in order to achieve a unique, customised product that meets the quality standards demanded by consumers.

Documents are known from the state of the art in which printing of suitcases can be performed in static systems and with static methods, while the needs of the market point to dynamic systems and methods which enable a more versatile and faster printing.

SUMMARY OF THE DISCLOSURE

The present disclosure describes a system and method for stamping suitcases and luggage items in in-line digital printing and drying, in a single pass. The disclosure is an in-line digital printing system for suitcases and luggage items that is a dynamic solution for decorating toiletry bags and all kinds of luggage. It is a series production system which enables the printing of suitcases and luggage items individually, thereby achieving greater versatility. Likewise, a method is proposed for digital printing of suitcases and luggage items.

It is a dynamic printing system, wherein each suitcase and luggage item is transported individually by a printing line such that it can print one by one, thereby achieving greater versatility by enabling different types of exclusive decorations.

The system has a traceability and tracking system for each suitcase and luggage item, an in-line colour printing module for suitcases and luggage items and movement means for moving suitcases and luggage items that are synchronised with each other in order to prevent possible impacts between suitcases and luggage items.

When there are bottlenecks in production chains, many products can collide or touch each other and become marked. If any scratches or impacts occur between the suitcases and/or luggage items and they become marked or deformed, they can no longer be sold. To prevent this, the movement means comprise a plurality of individual conveyors, such that a single suitcase or luggage item is found on each conveyor at any given time. Said individual conveyors are arranged forming a linear path for the passage of suitcases and luggage items.

Thanks to the traceability and tracking system, it is possible to control the position of each suitcase and luggage item in the system in a precise manner in real time, and to associate an image to be printed and/or different image colours to each of said suitcases and luggage items. Thus, the versatility of the system is greatly increased, which enables a different image to be printed on each suitcase and luggage item that passes through the printing module.

Said traceability and tracking system can be automated or manual. Thus, in a preferred embodiment, it can comprise the use of identification codes of the items in an individual manner. In another preferred embodiment, the traceability and tracking process and system do not use said codes, but rather an operator personally controls the type of printing of each item.

Likewise, the system enables double-sided printing on suitcases and luggage items. To do so, the system comprises two outlet tracks to which the suitcases and luggage items are directed after passing through the printing module. Depending on the identification code associated with each suitcase and luggage item, or according to the criteria and instructions of the operator, it is sent to a semi-finished product outlet track or to a final outlet track. The semi-finished product outlet track receives suitcases and luggage items that have already been printed on one side but will also be printed on the other side. The final outlet track receives the suitcases and luggage items that have already been printed on both sides, or suitcases and luggage items that only need to be printed on one side.

It is essential that the suitcase and luggage items which move through the system and are introduced into the printing module have at least one flat side or a flat cross section on one side whereon the printing is performed. Said flat side, or flat cross section of one side is the printing side whereon the image will be printed. The suitcase or luggage item is arranged in a position wherein, when it enters the printing module, the printing side (whereon there is a printing area inside of which the image will be printed) is facing printing heads of said printing module.

This flat side (or flat cross section for printing) must always be at a certain height with respect to the printing heads, which must be within a printing tolerance. This is a necessary condition in order to guarantee a correct printing process. The area of the suitcases or luggage items wherein the printing will be performed must always be in a single printing plane.

The system is especially designed to be used with rigid or semi-rigid suitcases and luggage items, for which reason it can be used without needing additional moulds or supports. However, in an exemplary embodiment wherein small suitcases and luggage items are to be printed, the system comprises coupling means intended to receive said suitcases and luggage items and keep them in a fixed position. These coupling means can be supports, by way of trays. The size of the supports depends on the size of the individual conveyors, such that they are configured so that a single support is on an individual conveyor at any time.

One or more suitcases or luggage items can be arranged on the supports, depending on the size thereof. To do so, each support comprises at least one housing configured to receive a suitcase or luggage item.

It may also be necessary to use these coupling means (supports or trays) if the suitcases and luggage items have a flat side but is not arranged parallel to an upper surface of the individual conveyors and therefore will not be perpendicular to the printing heads. In these cases, the housings of the coupling means (supports or trays) can have a special configuration so that, when the suitcases or luggage items are positioned in them, the flat side or flat cross section of one side is arranged in a correct printing plane.

The system may comprise a preparation module, before the printing module, wherein the suitcases and luggage items are placed, each suitcase being positioned or the luggage accessories being positioned on an individual conveyor, and wherein, with each suitcase or luggage item, the corresponding identification code thereof is associated, which is generated by the traceability and tracking system. In this preparation module, the suitcases and luggage items are placed in the supports if they are necessary.

The system may comprise at least one height detector, configured to detect the height of the suitcases and luggage items. Said height detector can be arranged before the printing module or in the inlet to it and is has the function of adjusting the height of the heads to the suitcase or luggage item to be printed, with the aim of obtaining an optimal printing result.

In a preferred embodiment, the system comprises a computer vision system configured to detect quality errors. The computer vision system can be arranged in the printing module or, for example, make up part of an inspection module, arranged after the printing module. The computer vision system is configured to scan the side of the suitcase or luggage item whereon the printing has been performed in order to detect if there are errors, for example, in the application of the colours, or in the shapes of the image, etc.

In another exemplary embodiment, the system further comprises a protection module. This protection module may comprise an automatic film placement device which selects the type of film, generally made of plastic, to be applied depending on the information from the identification code. In general, this protective film enables the integrity of the suitcase or luggage item to be ensured.

The traceability and tracking system can generate and be based on, as described previously, a unique two-dimensional code associated with each suitcase or luggage item. This generated code, called the identification code, is stored in a remote database. The identification code can comprise data such as the overall dimensions of the suitcase and luggage items, whether it will be printed on one or two sides, what the image to be printed is, the colour profile to be used in the printing, the type of suitcases and luggage items that it is (and which defines to which outlet track it is sent), the encrypted data regarding date/time/batch and/or empty fields which can be filled by the system itself afterwards, such as which is the printed side and whether the quality of the printing is acceptable or not.

In an exemplary embodiment, the traceability and tracking system generates a label with the identification code, configured to be removably joined to the suitcases and luggage items (so that it can be removed when the printing process is completed). Preferably, the label is always placed on suitcases and luggage items in the same position.

Said system comprises, in this embodiment, a first code reader configured to read the identification code of each suitcase or luggage item and send the corresponding work order (with the data obtained from said identification code) to the traceability and tracking system, the movement means and the printing module.

The first code reader is arranged at the inlet of the printing module or before said printing module in order to, depending on the information from the identification code, calibrate certain parameters of the printing module, such as the height and the lateral compensation of the printing heads (which depend on the measurements of each suitcase and luggage item), the image to be printed and the colour profile to be used.

At the outlet of the printing module and/or at the outlet of the inspection module and/or at the outlet of the protection module is a second code reader. As previously described, depending on the information from the identification code, the suitcase or luggage item is sent to the semi-finished product outlet track (if another side of the suitcase or luggage item needs to be printed) or sent to the final outlet track.

If the suitcases and luggage items are sent to the semi-finished product outlet track, each suitcase and luggage item is rotated and arranged in the preparation module once again. In a preferred embodiment, said operation can be carried out by an operator. In this manner, the suitcase or luggage item is made to pass back through the printing module in order to print on an additional printing side.

Preferably, the system comprises a lateral band, which acts as a guide for the suitcase or luggage item along the linear path for the passage of suitcases and luggage items. In this case, all suitcases or luggage items to be printed must have a flat lateral side, which has at least the height of the lateral band, in order to be able to position the identification code. If the use of a support is necessary, the suitcase or luggage item housed in the support must have at least this height.

The system may additionally comprise an antistatic bar configured to discharge from the suitcases or luggage items any possible accumulation of static electricity caused, especially, from the prior removal of the protective film.

In the printing module, there are means for regulating the height and position of the printing heads which are responsible for raising or lowering the heads and moving them linearly to the right or left until they are placed in the desired position with respect to the suitcases and luggage items to be printed. This regulation is performed automatically depending on the information from the identification code of each suitcase or luggage item. It is essential for the height of suitcases and luggage items to be maintained during the printing in order to ensure a correct quality thereof.

The printing module may also comprise a primer unit, a colour unit, an effects unit and one or more drying units depending on what is needed. Preferably, the at least one drying means can be a drying lamp.

In the primer unit there is a line of injectors for performing a priming or white base on the suitcases and luggage items that need it, which are dark-coloured suitcases or luggage items. This white primer must be exactly the same as the image to be printed so that no white outlines remain uncoloured.

The colour unit contains the printing heads. It is configured to perform the printing of the image in colour.

In an exemplary embodiment, the printing is performed by means of four-colour techniques using CMYK inks or OGV inks. To do so, the system comprises CMYK colour lines and/or OGV ink lines. The system could also comprise two heads with spot colours (predefined colours; in other words, the printing is done directly with said colours and not with the basic colours: magenta, yellow and cyan).

In this colour unit there is a plurality of colour bars, which have an electronics section wherein the connections to the traceability and tracking system, a bar of heads and a main ink tank are established. It may also comprise an automatic cleaning area. Preferably, said colour bars are removable, in order to ensure easy replacement in the event of a failure. By removing each colour bar, the corresponding printing head joined to it can be accessed in order to perform maintenance operations. Furthermore, the main tanks can be filled continuously, without needing to stop production.

In the effects unit, which makes up part of the printing module, glossy effects, varnishes, etc. can be applied. In this manner, different shades and brightness levels can be achieved, or a sensation of thickness can be made in different areas of the image.

One or more drying lines are located in the system, for example a first drying line located between the primer line and the four-colour lines, a second drying line between the CMK colour lines and the OGV inks, one drying line at the end of the colour and before the finishes, as well as a final one. Whenever a print or finish is applied, drying means are required. In a particular embodiment of the disclosure, the drying line may comprise a drying tunnel, for example by means of UV (ultraviolet) rays in order to fully fix the ink from the printing.

Another object of the present disclosure is a method for digital printing of suitcases and luggage items comprising at least the steps of: placing suitcases and luggage items on individual conveyors; assigning an identification code to each suitcase and luggage item; detecting the presence or absence of suitcases and luggage items on each of the individual conveyors and synchronising the movement of the individual conveyors.

If the presence of the item to be printed is not detected on a second individual conveyor, a step of moving the suitcase or luggage item which is on a first individual conveyor towards said second individual conveyor is performed, such that the suitcases and luggage items advance along the linear path of the system.

When the presence of the item to be printed is detected on a second individual conveyor, if the conveyor belt is moving in order to move the suitcases and luggage items towards the next individual conveyor, a step of moving the suitcases and luggage items from a first individual conveyor (before the second individual conveyor) towards said second individual conveyor is performed; if said second individual conveyor is stopped, a step of stopping the first individual conveyor is performed.

The method also comprises the step of collecting and recording information about each suitcase and luggage item introduced into the system. This action can be carried out by an operator, or in a preferred embodiment it is possible to automate the process, reading the identification code of each suitcase and luggage item and storing the associated information; and when a suitcase or luggage item reaches the printing module, printing an image on said suitcase or luggage item depending on the identification code thereof (or depending on the action of the operator, who controls it manually).

Preferably, in this embodiment wherein a tracking and traceability system is used, the method also comprises a step of reading the identification code of the suitcase or luggage item when it leaves the printing module. This step enables determining if the suitcase or luggage item is sent to a semi-finished product outlet track, from where it will be collected in order to place it back in a loading module/preparation module, or to the inlet of the printing module; this action can be carried out by an operator or it can be systematised. This occurs if, according to the identification code, the suitcase or luggage item will be printed on more than one side. In this case, these are suitcases and luggage items that have already been printed on one printing side and will now be printed on an additional printing side.

As previously described, if the suitcases and luggage items will be printed only on one side, or when they have already been printed on both sides, the identification code is read at the outlet of the printing module and the suitcase or luggage item is sent to a final outlet track.

Likewise, the method may comprise subsequent steps of checking the quality of the printing and/or of placing a protective film.

If the method is being used for printing suitcases and luggage items with a small size or special shapes, said method comprises a step of placing the suitcase or luggage item on a support designed to this end, which ensures the position of the suitcase or the luggage item during the entire path and prevents said small suitcases and luggage items from colliding with each other and displace during the movement of the system.

It is therefore a system which enables the linear digital printing of suitcases and luggage items without the needing to do batch printing. When an identification code is associated with each suitcase or luggage item, when said suitcases and luggage items arrive at the printing module, the printing/stamping of the corresponding image is performed, which can vary between consecutive suitcases and luggage items. The system enables the quality and variability demands of designs from users to be met, preventing scratches or impacts on suitcases or luggage items and providing a wide variety of models.

Likewise, the described method enables the in-line digital printing of suitcases and luggage items, ensuring a correct printing quality and preventing possible damage to the suitcases or luggage items during the entire printing procedure. The method adapts each printing to the corresponding suitcase or luggage accessory based on the identification code associated with it.

BRIEF DESCRIPTION OF THE FIGURES

To complete the description of the disclosure, and for the purpose of helping to make the characteristics thereof more readily understandable, according to a preferred exemplary embodiment thereof, a set of drawings is included where, by way of illustration and not limitation, the following figures have been represented.

DETAILED DESCRIPTION

The present disclosure discloses a method and a system for digital printing of suitcases and luggage items and a drying line, in a single pass, with which the customized stamping of suitcases and luggage items is achieved while protecting said suitcases and luggage items from possible impacts in order to ensure correct quality of the final printed suitcase or luggage item.

Figure 1:
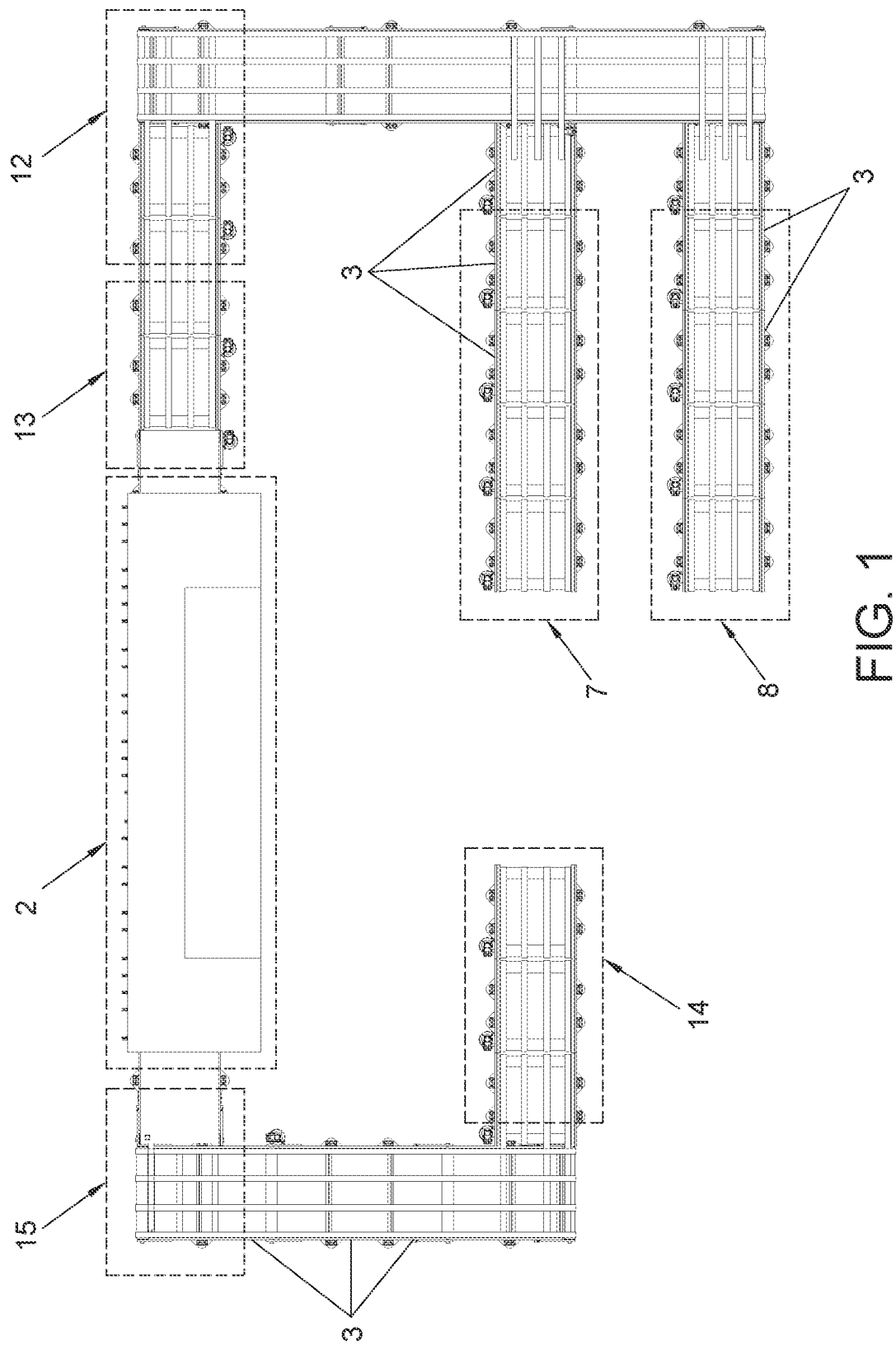
FIG. 1 represents a top view of the digital printing system for suitcases and luggage items.
Figure 2:
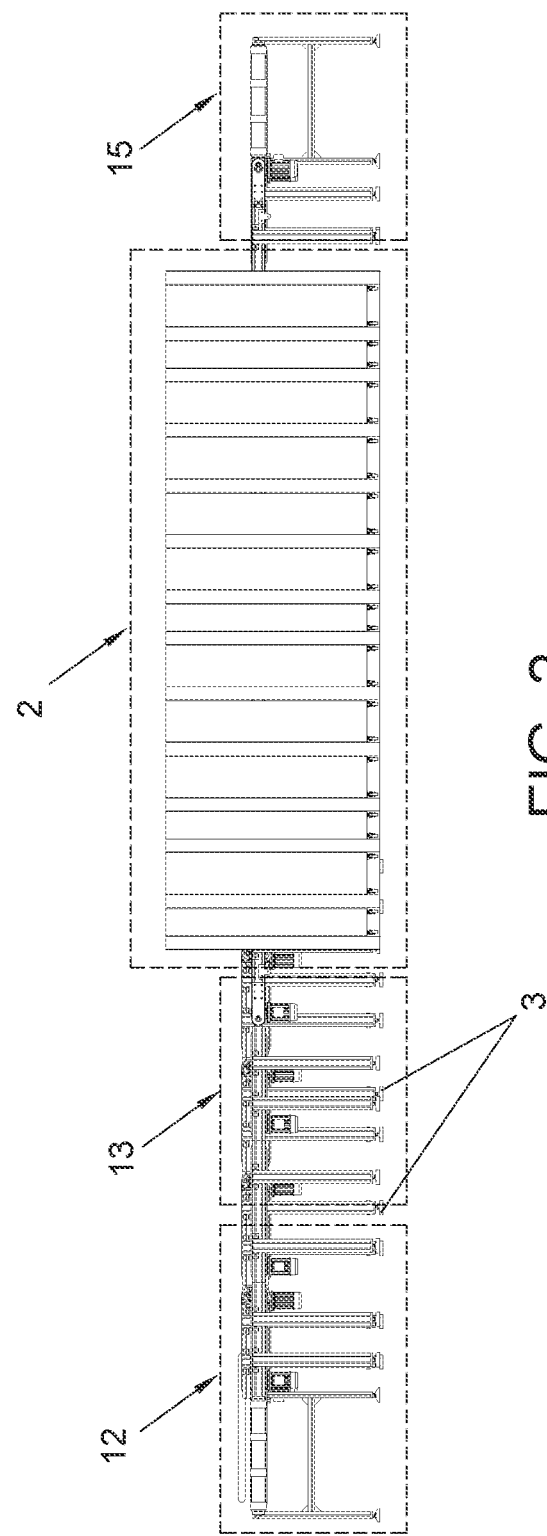
FIG. 2 represents an elevation view of the digital printing system for suitcases and luggage items.

FIG. 1 shows a top view of the digital printing system for suitcases and luggage items (1), while in FIG. 2 the system is shown in an elevation view.

The system comprises means for generating an identification code for each suitcase and luggage item (1) which are configured to generate a unique two-dimensional code associated with each suitcase and luggage item (1). Through this code, the suitcases and luggage items (1) are completely located in the system during the entire time they are in it. The data from the unique code is stored in a remote database.

In addition to enabling the traceability of the suitcases and luggage items (1), the code includes the features of the suitcases and luggage items (1) that will be necessary during the decoration operations. In other words, the code may include information on the size of the suitcase or luggage item (1), on the image that will be printed on said suitcases and luggage items (1), information on whether it has been printed on only one side or on two, etc.

The system comprises a printing module (2) configured to print an image on the suitcases and luggage items (1) depending on the identification code associated with said suitcases and luggage items (1) and a traceability and tracking system configured to determine the position of each suitcase and luggage item (1) in the system from the identification code thereof as previously described.

Likewise, the system comprises movement means configured to move the suitcases and luggage items (1) throughout the system. The movement means comprise a plurality of adjacent individual conveyors (3), forming a linear path for the passage of the suitcases and luggage items.

FIG. 1 shows an exemplary embodiment wherein the system comprises a loading module (14) configured to receive the suitcases and luggage items (1), followed by a preparation module (15) wherein it is assigned the identification code to each suitcase and luggage item (1), before the printing module (2) configured to print the corresponding image on each suitcase and luggage item (1); a subsequent inspection module (13), configured to scan the suitcases and luggage items (1) and determine if the printing was correct; a protection module (12) with at least one automatic placement device configured to apply a protective film, which is preferably made of plastic, on the suitcases and luggage items (1) and outlet tracks (7, 8) for the removal of the suitcases and luggage items (1).

FIG. 2 shows the same system but in an elevation view.

Figure 3A:
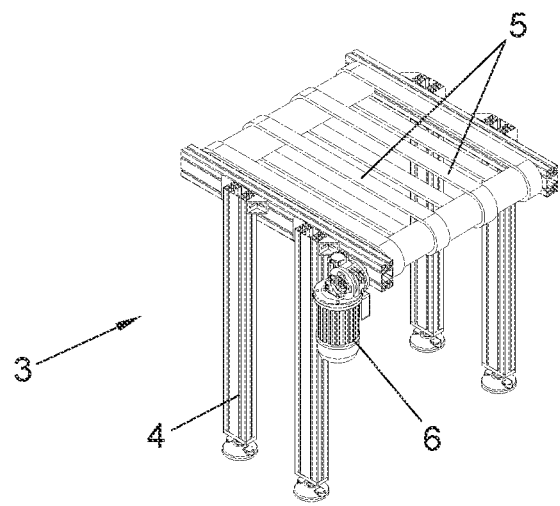
FIGS. 3A, 3B and 3C represent a perspective view, a top view and an elevation view of an individual conveyor of the system.
Figure 3B:
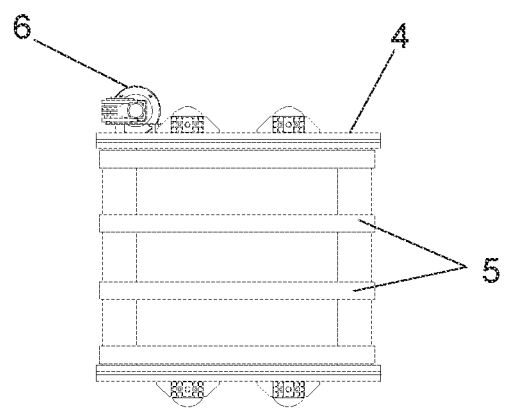
Figure 3C:
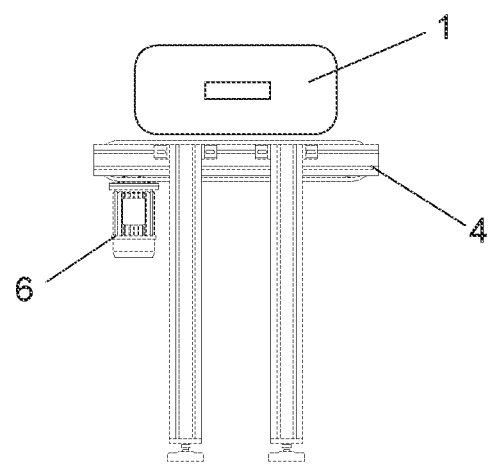

FIGS. 3A-C show an individual conveyor (3) in different views. More specifically, FIG. 3A shows an individual conveyor (3) in a perspective view wherein a frame (4), an individual conveyor belt (5) which extends along an upper surface of the frame (4) and a motor (6) are seen.

As seen in FIG. 3B, which is a top view of the individual conveyor (3), it can comprise more than one conveyor belt (5) if these have a width less than that of the upper surface of the frame (4) or for example due to other geometric motifs. The motor (6), which is an individual motor for each conveyor (3), controls the movement of the conveyor belt or belts (5). FIG. 3C shows an elevation view of the individual conveyor (3) wherein the frame (4) and the motor (6) are clearly visible.

Likewise, each individual conveyor (3) comprises a presence sensor for suitcases and luggage items.

An essential feature of the present disclosure is that the individual conveyors (3) are synchronized with each other such that the suitcases and luggage items (1) which are on a first individual conveyor (3) only move to a second individual conveyor (3) adjacent to it when it is detected that the suitcases and luggage items (1) arranged on said second individual conveyor (3) are moving or have moved to the next individual conveyor (3) or have been removed from the system, thereby preventing possible impacts between suitcases and luggage items (1).

Thus, if the presence of a suitcase or luggage item (1) is detected on a subsequent individual conveyor (3), the passage of suitcases and luggage items (1) which are placed on the individual conveyors (3) before those involved in the bottleneck is stopped or delayed, slowing down the movement in order to prevent the suitcases and luggage items (1) from coming into contact with each other.

Preferably, when the printing system comprises a tracking and traceability system, the latter system comprises a first code reader arranged before the printing module (2) or in it, configured to read the identification code of the suitcases and luggage items and send the information to a remote database. The reading of the identification code before entering the printing module (2) enables the variable parameters of the printing module components to be adapted to each specific suitcase and luggage item (1) that will be decorated.

Likewise, the system preferably comprises two outlet tracks (7, 8), as seen in FIG. 1, arranged after the printing module (2). These tracks are a semi-finished product outlet track (7), to which the suitcases and luggage items that will be printed on two sides are sent, and a final outlet track (8), to which the suitcases and luggage items that are only printed on one side or those that have already been printed on two sides are sent.

Preferably, the system comprises a second code reader configured to obtain the information from the identification code of each suitcase or luggage item and, depending on it, direct the suitcases and luggage items to the semi-finished product outlet track (7) or to the final outlet track (8). In an exemplary embodiment, the second code reader is arranged at the outlet of the printing module (2).

Thanks to the fact that the system directly sends the suitcases and luggage items to one outlet track (7, 8) or the other, the operators do not have to be constantly aware of which suitcases and luggage items are already finished and which ones still have to be rotated to be printed again. Human errors due to mistakes or ignorance are also prevented. The operators directly know that the suitcases and luggage items that are in the semi-finished product outlet track (7) have to be loaded in the loading module (14) again (or at the inlet of the printing module (2) if the system does not have a loading module (14) or preparation module (15)).

Likewise, the suitcases and luggage items (1) that the system has sent to the final outlet track (8) are already removed from the system.

In a preferred exemplary embodiment, the system also comprises a height detector, arranged before or in the inlet of the printing module (2), configured to adjust the height of the heads to the suitcase or luggage item to be printed, with the aim of obtaining an optimal printing result.

As previously described, the position of the printing heads is regulated automatically. To do so, the system comprises means for regulating the height and position of the printing heads configured to raise and lower the printing heads and move them linearly to the right or left until they are placed in a desired position with respect to the suitcases and luggage items to print. This enables printing on suitcases and luggage items (1) with different heights and/or different measurements of the printing side. Furthermore, by positioning the head in the specific area to be printed, it is not necessary for all the suitcases and luggage items (1) to have the image printed in the centre, but rather it can be printed, for example, near a corner of the suitcase or luggage item (1).

The printing module (2) can also comprise a primer unit configured to spread a primer coat on the printing side of the suitcase or luggage item (1).

The printing module (2) further comprises a colour unit with at least one colour bar comprising an electronics section configured to connect to the traceability and tracking system, printing heads and a main ink tank.

Additionally, the printing module (2) may comprise an effects unit configured to perform an additional digital printing on the image printed on the suitcase or luggage item (1). Likewise, the printing module (2) preferably has a drying unit with UV ray generation devices configured to dry and fix the ink of the printed image.

In order to ensure correct quality of the suitcases and luggage items (1) leaving the system, it can comprise computer vision means configured to scan the printing side of each suitcase and luggage item (1) and detect possible printing errors. These computer vision means can be housed in the printing module (2) or in an inspection module (13) arranged after the printing module (2). If the system comprises a second code reader, it can be arranged at the outlet of the inspection module (13).

As shown in the example of FIG. 1, the system may also comprise a protection module (12) wherein there is an automatic placement device for placing a protective film on the printing side of suitcases and luggage items (1). If the system comprises a second code reader, it can be arranged at the outlet of the protection module (12).

Figure 4:
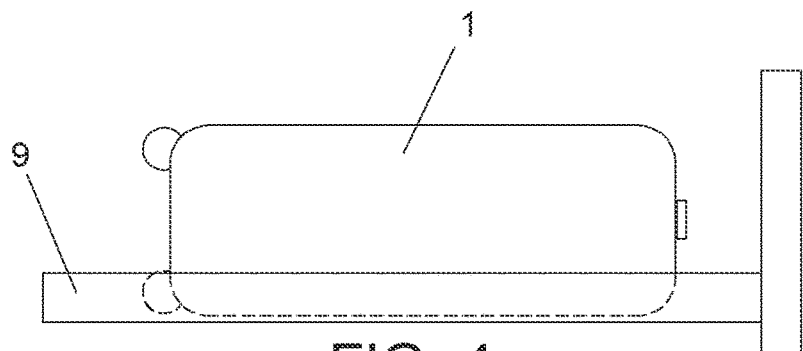
FIG. 4 represents a side view of a suitcase moving towards the printing module resting on a guide.

FIG. 4 shows a lateral band (9) which can make up part of the system and which has a certain height, and acts as a guide for suitcases and luggage items (1) throughout the system. The lateral band (9) extends along the linear path for the passage of suitcases and luggage items. In these cases, the suitcases and luggage items (1) should have a height, in the position indicated in the figure, that is greater than the height of the lateral band (9).

Figure 5A:
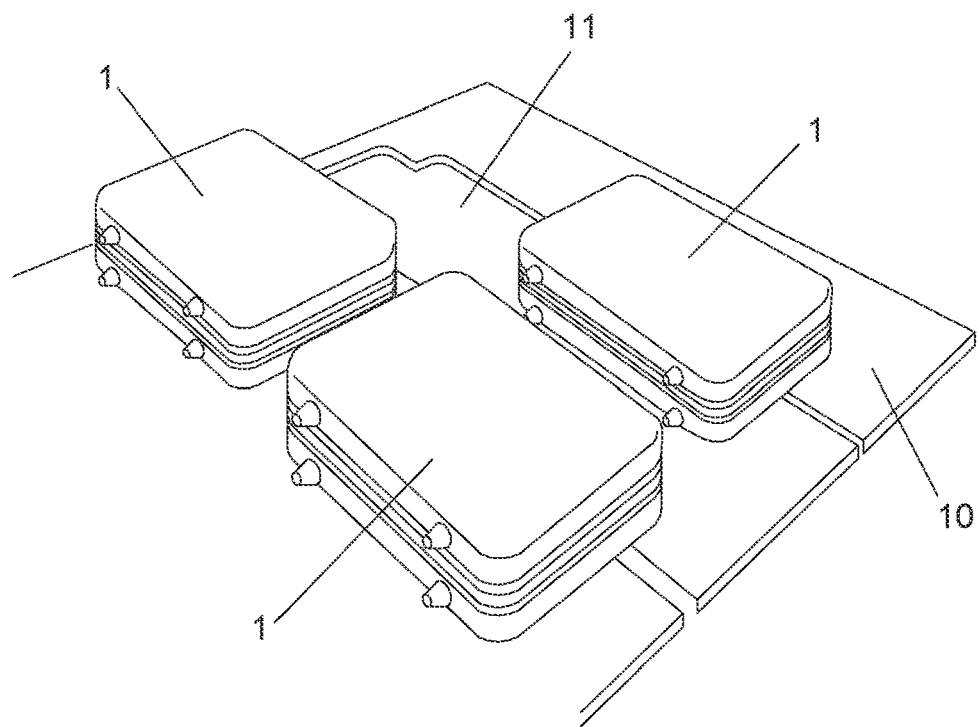
FIG. 5A represents a support tray wherein several small suitcases and luggage items are observed.
Figure 5B:
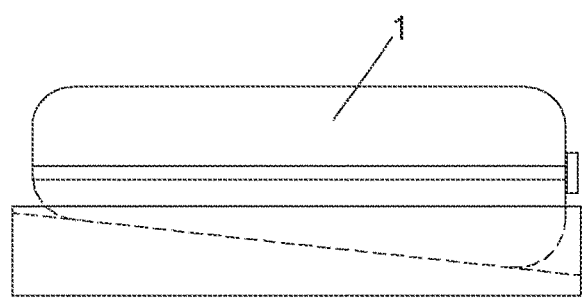
FIG. 5B represents a suitcase with a non-flat side, arranged in a support tray for the correct levelling thereof.

FIG. 5 shows a support (10) intended to be used if the suitcases and luggage items to be printed are small and/or have flat sides or cross sections with flat sides that would not stay in a printing plane perpendicular to the printing heads. The supports (10) make up part of the system and comprise, as seen in FIG. 5, at least one housing (11) configured to receive suitcases and luggage items (1). In the case of the figure, a support (10) with four housings (11) is seen. In three of said housings (11) there are toiletry bags, the fourth housing (11) is shown as empty. The supports (10) have a shape and measurements adapted to those of the upper surface of the individual conveyors (3).

Another object of the present disclosure is a method for digital printing of suitcases and luggage items comprising the following steps:

a) placing a suitcase or luggage item (1) on an individual conveyor (3) of a plurality of individual conveyors (3) which are arranged adjacent to each other forming a linear path for the passage of suitcases and luggage items;

b) assigning an identification code to each suitcase and luggage item (1);

c) detecting the presence of suitcases and luggage items (1) on each of the individual conveyors (3);

if no presence is detected on a second individual conveyor (3), moving the suitcases and luggage items (1) from a previous first individual conveyor towards said free second individual conveyor (3), such that the suitcases and luggage items (1) advance along the linear path for the passage of suitcases and luggage items, if the presence is detected on a second individual conveyor (3):

if the conveyor belt (5) of said individual conveyor (3) is in motion in order to move the corresponding suitcases and luggage items (1) towards the next individual conveyor (3), moving the suitcases and luggage items (1) from the previous first individual conveyor (3) towards said second individual conveyor (3);

if said second individual conveyor (3) is stopped, the first individual conveyor (3) stops;

d) reading the identification code of each suitcase or luggage item (1) and storing the associated information;

e) when a suitcase or luggage item (1) reaches a printing module (2), printing an image on the suitcase or luggage item (1) depending on the identification code thereof.

Preferably, the method also comprises a step of reading the identification code of each suitcase or luggage item (1) at the outlet of the printing module (2) and:

if it is a suitcase or luggage item (1) that needs to be printed on an additional side, sending the suitcase or luggage item (1) to a semi-finished product outlet track (7);

if it is a suitcase or luggage item (1) that has already been printed on one printing side and on an additional side, or a suitcase or luggage item (1) that only needs to be printed on one printing side, sending said suitcase or luggage item (1) to a final outlet track (8).

Likewise, the method may comprise a step of detecting the height of the suitcases and luggage items (1) and, if said height is greater than a predetermined height, stopping the individual conveyor (3) whereon said suitcase or luggage item (1) is located as well as the individual conveyors (3) before it.

In the printing module (2) of the system, it is also possible to perform at least one step of priming before printing in a printing area on a printing side of the suitcases and luggage items (1), a step of printing in colour in a printing area on a printing side of suitcases and luggage items (1), an step of additional digital printing on the image printed on suitcases and luggage items (1) or a step of drying the image printed on the suitcases and luggage items.

If the use of supports (10) is necessary, the method comprises a step of placing at least one suitcase or luggage item (1) in a housing (11) of a support (10) and placing said support (10) on an individual conveyor (3).

When the suitcase or luggage item (1) is in the printing module (2), the method comprises moving printing heads, vertically and to the right and left, until they are positioned over a printing area on a flat side or flat cross section of a printing side of a suitcase or luggage item (1). Subsequently, the method may comprise the action of scanning the surface of the suitcases and luggage items (1) corresponding to the printing area and determining if the printed image is printed correctly.

Also, the method may comprise a step of applying a protective film on the printing side of the suitcase or luggage item (1) after it has been printed.

The invention claimed is:

1. A system for digital printing of suitcases and luggage items comprising:

a printing module, with at least one printing head, configured to print an image on a printing side of the suitcases and luggage items, depending on a customised identification code associated with each suitcase or luggage item or by means of the supervision of an operator;

a traceability and tracking system configured to determine the position of each suitcase or luggage item in the digital printing system, by means of the identification code or by means of the supervision of the operator;

movement means, configured to move the suitcases and luggage items throughout the digital printing system, wherein the movement means comprise a plurality of adjacent individual conveyors, forming a linear path for the passage of suitcases and luggage items, wherein each individual conveyor comprises:

a frame;

at least one conveyor belt which extends along an upper surface of the frame;

an individual motor which controls the movement of the at least one conveyor belt; and a presence sensor for suitcases and luggage items;

and wherein the individual conveyors are synchronised with each other such that the suitcases and luggage items which are on a first individual conveyor only move to a second individual conveyor adjacent to it when it is detected that the suitcases and luggage items arranged on said second individual conveyor are moving or have already moved to the next individual conveyor or have been removed from the digital printing system, thereby preventing possible impacts between suitcases and luggage items.

2. The system according to claim 1, comprising means for generating an identification code for each suitcase and luggage item, configured to generate a customised unique two-dimensional code associated with each suitcase and luggage item.

3. The system according to claim 1, comprising a first code reader arranged in a position before the printing module or in this same module, configured to read the identification code of the suitcases and luggage items and send it to a remote database.

4. The system according to claim 3, wherein the second code reader is arranged at the outlet of the protection module.

5. The system according to claim 1, comprising two outlet tracks, arranged after the printing module, these being a semi-finished product outlet track to which the suitcases and luggage items that will be printed on two sides are sent, and a final outlet track to which the suitcases and luggage items that are only printed on one side or those that have already been printed on two sides are sent.

6. The system according to claim 5, comprising a second code reader configured to obtain the information from the identification code of each suitcase or luggage item, or to obtain the information from the image associated with said suitcase or item and, depending on said information, choose the outlet track, directing the suitcases and luggage items to the semi-finished product outlet track or to the final outlet track.

7. The system according to claim 6, wherein the second code reader is arranged at the outlet of the printing module.

8. The system according to claim 5, wherein the second code reader is arranged at the outlet of the inspection module.

9. The system according to claim 1, wherein the printing module comprises means for regulating the height and position of the printing heads, configured to raise and lower said printing heads and move them linearly to the right or left until they are placed in a required position for the suitcase or luggage item to be printed.

10. The system according to claim 9, comprising a height detector, arranged before the printing module or in the inlet thereof, configured to adjust the height of the heads to the suitcase or luggage item to be printed.

11. The system according to claim 1, wherein the printing module comprises a primer unit configured to spread a primer coat on the printing side of the suitcase or luggage item, wherein said primer coat matches the image to be printed.

12. The system according to claim 1, wherein the printing module comprises a colour unit with at least one colour bar comprising an electronics section configured to connect to the traceability and tracking system, printing heads and a main ink tank.

13. The system according to claim 1, wherein the printing module comprises an effects unit configured to perform an additional digital printing on the image printed on the suitcase or luggage item.

14. The system according to claim 1, wherein the printing module comprises at least one drying unit comprising UV ray devices configured to dry the image printed on the suitcase or luggage item.

15. The system according to claim 1, comprising computer vision means configured to scan the printing side of each suitcase and luggage item and detect possible printing errors.

16. The system according to claim 15, wherein the computer vision means are located in the printing module or in an inspection module, arranged after the printing module.

17. The system according to claim 1, comprising a protection module wherein there is an automatic placement device for placing a protective film on the printing side of the suitcase or luggage item.

18. The system according to claim 1, comprising at least one support with at least one housing configured to receive the suitcases and luggage items, and wherein the support has a shape and measurements adapted to those of the upper surface of the individual conveyors.

19. The system according to claim 1, comprising a lateral band along the linear path for the passage of suitcases and luggage items configured to act as a guide for the suitcases and luggage items.

20. The system according to claim 1, comprising a loading module and/or a preparation module, arranged before the printing module, configured to receive the suitcases and luggage items that will be printed.

21. A method for digital printing of suitcases and luggage items by means of the system according to claim 1, comprising:
   a) placing a suitcase or luggage item on an individual conveyor of a plurality of individual conveyors which are arranged adjacent to each other forming a linear path for the passage of suitcases and luggage items;
   b) assigning an identification code to each suitcase or luggage item, or identifying it by means of an operator;
   c) detecting the presence of suitcases and luggage items on each of the individual conveyors, such that:
      if no presence is detected on a second individual conveyor, moving the suitcases and luggage items from a previous first individual conveyor towards said free second individual conveyor, such that the suitcases and luggage items advance along the linear path for the passage of suitcases and luggage items,
      if the presence is detected on a second individual conveyor:
      if the conveyor belt of said individual conveyor is in motion in order to move the corresponding suitcases and luggage items towards the next individual conveyor, moving the suitcases and luggage items from the previous first individual conveyor towards said free second individual conveyor;
      if said second individual conveyor is stopped, the first individual conveyor stops;
   d) reading the identification code of each suitcase or luggage item and storing the associated information, or recording each suitcase or luggage item by an operator; and
   e) when a suitcase or a luggage item reaches a printing module, printing an image on the suitcase or luggage item depending on the identification code thereof or the instructions of the operator.

22. The method according to claim 21, comprising a step of reading the identification code of each suitcase and luggage item at the outlet of the printing module and:
   if it is a suitcase or luggage item that needs to be printed on an additional side, sending the suitcase and luggage item to the semi-finished product outlet track;
   if it is a suitcase or luggage item that has already been printed on one printing side and on an additional side, or if it is a suitcase and luggage item that only needs to be printed on one printing side, sending the suitcase or luggage item to the final outlet track.

23. The method according to claim 21, comprising a step of detecting the height of the suitcases and luggage items and moving the at least one printing head to a height suitable for the printing of each suitcase or luggage item.

24. The method according to claim 21, comprising at least one of the following steps:
   performing a priming before the printing in a printing area on a printing side of the suitcases and luggage items;
   performing a printing in colour in a printing area on a printing side of the suitcases and luggage items;
   performing an additional digital printing on the image printed on the suitcases and luggage items;
   performing a drying of the image printed on the suitcases and luggage items.

25. The method according to claim 21, comprising a step of placing at least one suitcase or luggage item in a housing of a support and placing said support on an individual conveyor.

26. The method according to claim 21, which, when the suitcase or luggage item is in the printing module, comprises a step of moving the at least one printing head vertically and to the right and left, until it is positioned over a printing area on a flat side or flat cross section of a printing side of the suitcase or luggage item.

27. The method according to claim 21, comprising scanning the surface of the suitcase or luggage item corresponding to the printing area and determining if the printed image is printed correctly.

28. The method according to claim 21, comprising applying a protective film on the printing side of the suitcase or luggage item after it has been printed.

\* \* \* \* \*